(12) United States Patent
Mowatt et al.

(10) Patent No.: US 12,326,956 B2
(45) Date of Patent: *Jun. 10, 2025

(54) METHOD AND SYSTEM OF PROVIDING ACCESS TO DOCUMENTS STORED IN PERSONAL STORAGE MEDIUMS

(71) Applicant: Microsoft Technology Licensing, LLC, Redmond, WA (US)

(72) Inventors: David Mowatt, Dublin (IE); David Ahs, Dublin (IE)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/760,945

(22) Filed: Jul. 1, 2024

(65) Prior Publication Data

US 2024/0354435 A1 Oct. 24, 2024

Related U.S. Application Data

(63) Continuation of application No. 17/731,045, filed on Apr. 27, 2022, now Pat. No. 12,045,360.

(51) Int. Cl.
*G06F 21/62* (2013.01)

(52) U.S. Cl.
CPC .............................. *G06F 21/6218* (2013.01)

(58) Field of Classification Search
CPC ... G06F 21/6218; G06F 16/9017; G06F 16/34
See application file for complete search history.

*Primary Examiner* — Brian F Shaw
(74) *Attorney, Agent, or Firm* — Novo TechIP International PLLC

(57) ABSTRACT

A system and method for providing access to data stored in a personal storage medium includes receiving a search query from a searching entity for searching for the data, determining if the data includes data stored in the personal storage medium of a user, upon determining that the data includes data stored in the personal storage medium, determining if the user has consented to provide access to the data to the searching entity and if so, searching a search index associated with the personal storage medium for the data, and providing one or more search results or a notification that no search results were identified to the searching entity.

20 Claims, 6 Drawing Sheets

METHOD AND SYSTEM OF PROVIDING ACCESS TO DOCUMENTS STORED IN PERSONAL STORAGE MEDIUMS

CROSS-REFERENCE TO RELATED APPLICATIONS

This application claims the benefit of priority from pending U.S. patent application Ser. No. 17/731,045, filed on Apr. 27, 2022, and entitled "METHOD AND SYSTEM OF PROVIDING ACCESS TO DOCUMENTS STORED IN PERSONAL STORAGE MEDIUMS."

BACKGROUND

Enterprises that have the resources for setting up computer environments, often enable their employees to save their data to a common data store (e.g., a cloud-based data store). This enables users of the computer environment to easily share and gain access to documents stored by the employees within that enterprise. However, many smaller businesses, individual users and those enterprises that do not have the resources for setting up an enterprise computer environment often have an ad hoc way of organizing their data and their digital footprint. For example, small businesses often store business documents or documents that may need to be shared with others in on individual storage, for example on a hard disk, in email, and/or on personal cloud storage of various employees of the business. As a result, documents may not be accessible to other employees.

Furthermore, when different employees store documents in different personal storage medium, conducting a search for and finding a desired document may be very challenging and may require manual intervention by multiple individuals (e.g., each person searching their own storage mediums). In this scenario, if a small business employee tries to find the latest invoice sent to a particular customer, they will not be able to locate the document on their own, if the document is stored in a personal storage medium of another employee.

Hence, there is a need for improved systems and methods of providing access to documents stored in personal storage mediums in a secure manner that respects user privacy.

SUMMARY

In one general aspect, the instant disclosure presents a data processing system having a processor and a memory in communication with the processor wherein the memory stores executable instructions that, when executed by the processor, cause the data processing system to perform multiple functions. The function may include receiving a search query from a searching entity for searching for the data, determining if the data includes data stored in the personal storage medium of a user, upon determining that the data includes data stored in the personal storage medium, determining if the user has consented to provide access to the data to the searching entity and if so, searching a search index associated with the personal storage medium for the data, and providing one or more search results or a notification that no search results were identified to the searching entity.

In yet another general aspect, the instant disclosure presents a method for providing access to data stored in a personal storage medium. In some implementations, the method includes receiving a search query from a searching entity for searching for the data, determining if the data includes data stored in the personal storage medium of a user, upon determining that the data includes data stored in the personal storage medium, determining if the user has consented to provide access to the data to the searching entity and if so, searching a search index associated with the personal storage medium for the data, and providing one or more search results or a notification that no search results were identified to the searching entity.

In a further general aspect, the instant application describes a non-transitory computer readable medium on which are stored instructions that when executed cause a programmable device to perform functions of receiving a search query from a searching entity for searching for the data, determining if the data includes data stored in the personal storage medium of a user, upon determining that the data includes data stored in the personal storage medium, determining if the user has consented to provide access to the data to the searching entity and if so, searching a search index associated with the personal storage medium for the data, and providing one or more search results or a notification that no search results were identified to the searching entity.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1:
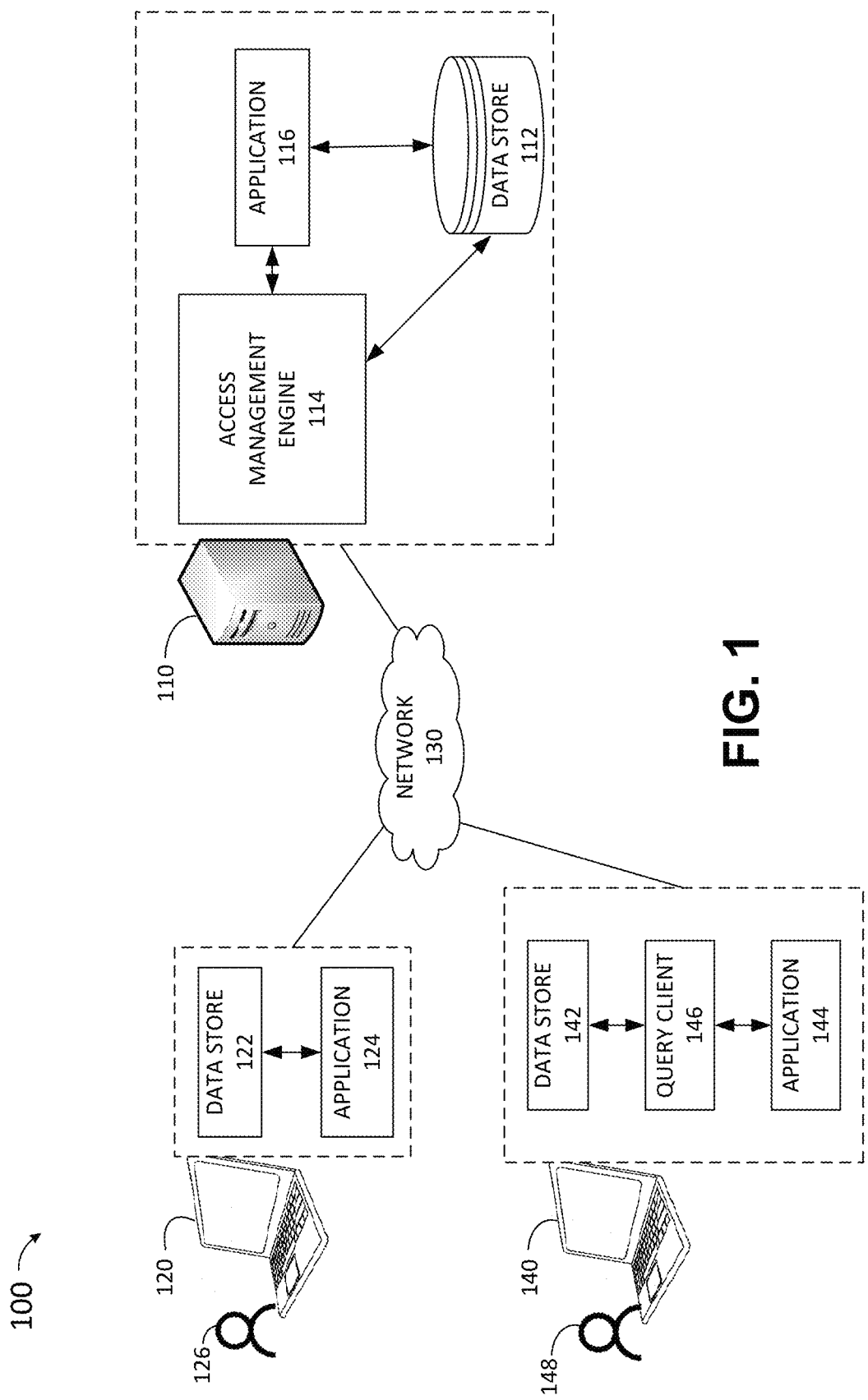
FIG. 1 depicts an example system upon which aspects of this disclosure may be implemented.

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

Many large enterprises and individual computer users store their digital documents on cloud storage or local storage servers that can be accessed by multiple employees. The cloud storage or local storage servers may provide mechanisms for enabling access to the storage mediums to multiple employees of an enterprise. For example, many computer environments and cloud storage systems enable a user to share a document or a document folder with one or more other users. However, a small business that does not have the resources to set up a local storage server or does not use cloud storage and individual users that store their data on a local storage medium (e.g., local client device or local hard drive) cannot easily share documents with others. Sharing a document in such instances often involves the owner sending the document directly (e.g., via email) to the requester. The process of exchanging communications (e.g., a requester sending an email to the owner, the owner locating the document and responding to the request) takes an unnecessary amount of time and human intervention by multiple individuals. Furthermore, for a small business where multiple employees store documents in their personal storage mediums, the process may involve sending a request to multiple people. Several people may then need to spend time looking for the desired document. This is not only an inefficient use of time, but it may also result in documents being stored on multiple separate storage mediums to enable access to multiple users. Furthermore, enabling access to documents stored in personal storage mediums is a challenging task as it requires compliance with many privacy guidelines. As such, there exists a technical problem of lack of mechanisms for efficiently providing access to documents stored on personal storage mediums.

To address these technical problems and more, in an example, this description provides technical solutions for providing federated access to documents stored in personal storage mediums. This may involve use of a federated access engine that operates with a user account system, invitation system, consent system, and indexing system to enable access to one or more documents stored on a personal storage medium. The process may involve enabling a requesting user to invite others to provide consent for accessing one or more documents stored on their personal storage medium, receiving the consent, and then operating with an indexing service to enable access to the documents when a query for the document is received from the requesting user file share and a service for enabling a group of users to save their data to individual data stores and enable sharing and discovery of that data by others within the group. In some implementations, a system is provided for enabling federated access and federated queries across individual data stores by utilizing a user account service and an invitation service that allows a user to request other users to provide consent to searching their documents according to various selectable consent models that allow the first user to access the other users' data stores with various levels of granularity for allowed queries, document type, folders, templates and the like. The technical solution may also include providing enterprise search capability according to a federated query service where a search index is compiled according to the contents of various users' data stores and based on the consent models and/or provided permissions.

The technical solutions described herein address the technical problem of inefficiencies, barriers and difficulties in providing access to documents stored in personal storage mediums. The technical solutions provide for use of a federated access and query system for providing access to documents saved in individual data stores in a safe and private manner. The technical solution enables a user to grant access to a selected number of their locally stored documents to one or more desired users. The technical effects at least include (1) improving the efficiency and the process of providing access to documents stored in personal storage mediums; (2) improving the efficiency and accuracy of using an electronic device to search for documents by providing access to indexing services offered by other applications; and (3) improving the efficiency of searching for and gaining access to documents by enabling small businesses and individual users to collaborate and share documents without the need to set up computer environments or utilize cloud storage.

As will be understood by persons skilled in the art, upon reading this disclosure, benefits and advantages provided by such implementations can include, but are not limited to a technical solution to the technical problems of lack of adequate mechanisms for efficiently and securely gain access to documents stored in personal storage mediums. The benefits made available by these technology-based solutions provide automated, user-friendly and efficient mechanisms for processing search queries for documents stored in personal storage mediums and for providing access to such documents when permission is granted.

As used herein, the term "personal storage medium" may refer to a local client device, local hard disc, or any other local storage medium or a cloud-based storage medium that is only accessible to the owner of the storage medium. The term "document" or "data" may refer to any digital document or data such as metadata associated with a digital document or data retrieved from a digital document. Documents may include word documents, spreadsheet documents, presentation documents, multimedia documents, email messages, instant messages, digital images, audio/video files and the like.

FIG. 1 illustrates an example system 100, upon which aspects of this disclosure may be implemented. The system 100 may include a server 110 which may be connected to or include a data store 112 which may function as a repository in which data sets relating to user account data, consent data, indexing library, training models, and the like may be stored. Although shown as a single data store, the data store 112 may be representative of multiple storage devices and data stores which may be connected to each of the various elements of the system 100. Furthermore, although the data store 112 is shown as being part of the server 110, one or more elements (e.g., storage mediums) of the data store 112 may be provided in separate storage servers or other types of servers. Moreover, the server 110 may include a plurality of servers that work together to deliver the functions and services provided by each service or application. The server 110 may operate as a cloud-based server for offering access management services. Server 110 may also operate as a shared resource server located at an enterprise which is accessible by and/or has access to data collected from various computer client devices such as client devices 120A-120N.

The server 110 may include and/or execute an access management engine 114 which may provide document access management services for users desiring to gain access to and/or provide access to documents stored in personal storage mediums. Access to the documents may be requested via client devices such as client device 120. The request may be for accessing documents on a local client device such as the client device 140. The access management engine 114 may operate to receive a request from a user 126 utilizing the client device 120 for gaining access to one or more documents owned by user 148. In an example, the user 126 is an owner of a small business and the user 148 is an employee of the small business. Upon receiving the request, the access management engine 114 may operate with one or more other elements to send an invitation to user 148 to provide consent for accessing their documents.

Upon receiving the invitation, user 148 may utilize an application such as application 144 or a user agent (e.g., a web browser) to give consent for providing access to one or more documents. The documents may be stored locally in the client device 140 in a storage medium such as the data store 142. Alternatively, the documents may be stored in a different client device (to which user 148 has access via client device 140) or they may be stored in a personal cloud storage medium. Once consent has been granted, user 126 may utilize an application such as application 124 to submit a search query for documents. The access management engine 114 may receive the search query and may operate with a search engine or may directly process the search query against one or more documents to which the user 126 has been granted access. When search results corresponding to the search query are identified, the access management engine 114 may transmit the search results to the client device 120 for display to the user 126. The access management engine 114 may include one or more separate elements or may operate with other elements that perform each of the functions of user account services, invitation services, consent management services, document indexing services and/or search services as further discussed below with respect to FIGS. 2-3.

Each of the client devices 120 and 140 may be connected to the server 110 via a network 130. The network 130 may be a wired or wireless networks or a combination of wired and wireless networks that connect one or more elements of the system 100. The client devices 120 and 140 may be personal, handheld computing devices or internet of things (IoT) devices having or being connected to input/output elements that enable a user to interact with various applications (e.g., applications 124, 144 or 166). Examples of suitable client devices 120 and 140 include but are not limited to personal computers, desktop computers, laptop computers, mobile telephones, smart phones, tablets, phablets, smart watches, wearable computers, gaming devices/computers, televisions, closed-circuit television (CCTV) cameras, smart alarm, smart door locks, GPS tracking devices and the like. The internal hardware structure of a client device is discussed in greater detail in regard to FIGS. 5 and 6.

The client device 140 may be representative of a client device at which documents that are shared with another user are stored. In a real-world scenario, a requesting user may request access to documents owned by multiple users and/or stored on multiple client devices 140. The client device 140 may include one or more applications 144. Each application 144 may be a computer program executed on the client device 140 that configures the device to be responsive to user input to allow a user to use access management tools such as providing consent for access to the user's document. For example, application 144 may provide a user interface (UI) that prompts the user 148 to confirm their consent to providing access to their documents. The UI may enable the user to choose the folder, the type of document (e.g., all documents having the term "invoice' in their title) and/or specific documents to which access should be granted. Application 144 may also be representative of applications or operating systems on the client device 140 that offer indexing of the documents stored in the data store 142.

The data store 142 may be representative of any local storage medium of the client device 140 on which documents are stored and may include an email data store, a document data store and/or a local index library of local documents. The documents stored on the data store 142 may include both work related and personal documents. In an example, work related, and personal documents are stored in the same data stores (e.g., document data store) and/or same folders. For example, a small family business that has begun using the family laptop computer for the business may store both personal documents and business documents. In some implementations, a search index is generated and available for each of the data stores (e.g., email data store, document data store, etc.) within the data store 142. The indexes for the separate data stores may be combined or separate. The index enables a keyword and/or metadata-based searching of the documents stored in the data store 142. In some implementations, some or all of the search indexes may be transmitted for storage in a cloud-based storage server such as the data store 112 such that when the client device 140 is offline, searching for documents in the data store 142 is still possible.

The query client 146 may be responsible for query filtering, consent verification and/or executing a search query against local documents. In an example, the search query may be executed on one or more index libraries that are stored in the data store 142 and provide an index of locally stored documents. In one implementation, the query client 146 utilizes one or more application programming interfaces (APIs) to query one or more applications running locally on the client device 140 to provide consent verification and/or searching for documents.

In some implementations, applications used for providing access management services are executed on the server 110 (e.g., application 116) and are provided via an online service. In some implementations, web applications communicate via the network 130 with a user agent (not shown), such as a browser, executing on the client device 140. The user agent may provide a user interface (UI) that allows the user to interact with the application 116 and may enable application 116 to provide data to the access management engine 114 for processing.

The client device 120 may be representative of a client device used to request access to documents stored elsewhere to which the user 126 does not have access. The client device 120 may include one or more applications 124. Each application 124 may be a computer program executed on the client device 120 that configures the device to be responsive to user input to allow the user 126 to use access management tools such as requesting another user to provide access to one or more of their documents and submitting a search query for documents. For example, application 124 may provide a UI that prompt the user 126 to submit a search query for documents. The UI may enable the user to enter one or more search terms, select one or more storage locations to search, or provide the name of other identifying information for one or more other users such as user 148 whose documents can be searched/accessed. The client device 120 may also include a data store 122 for storing documents and/or index libraries for local documents. In an example, the data store 122 may include a document data store, an email data store and one or more index libraries.

Documents stored in the data store 122 may be accessible by other users, if access to them is requested by other users and granted by the user 126.

Figure 2:
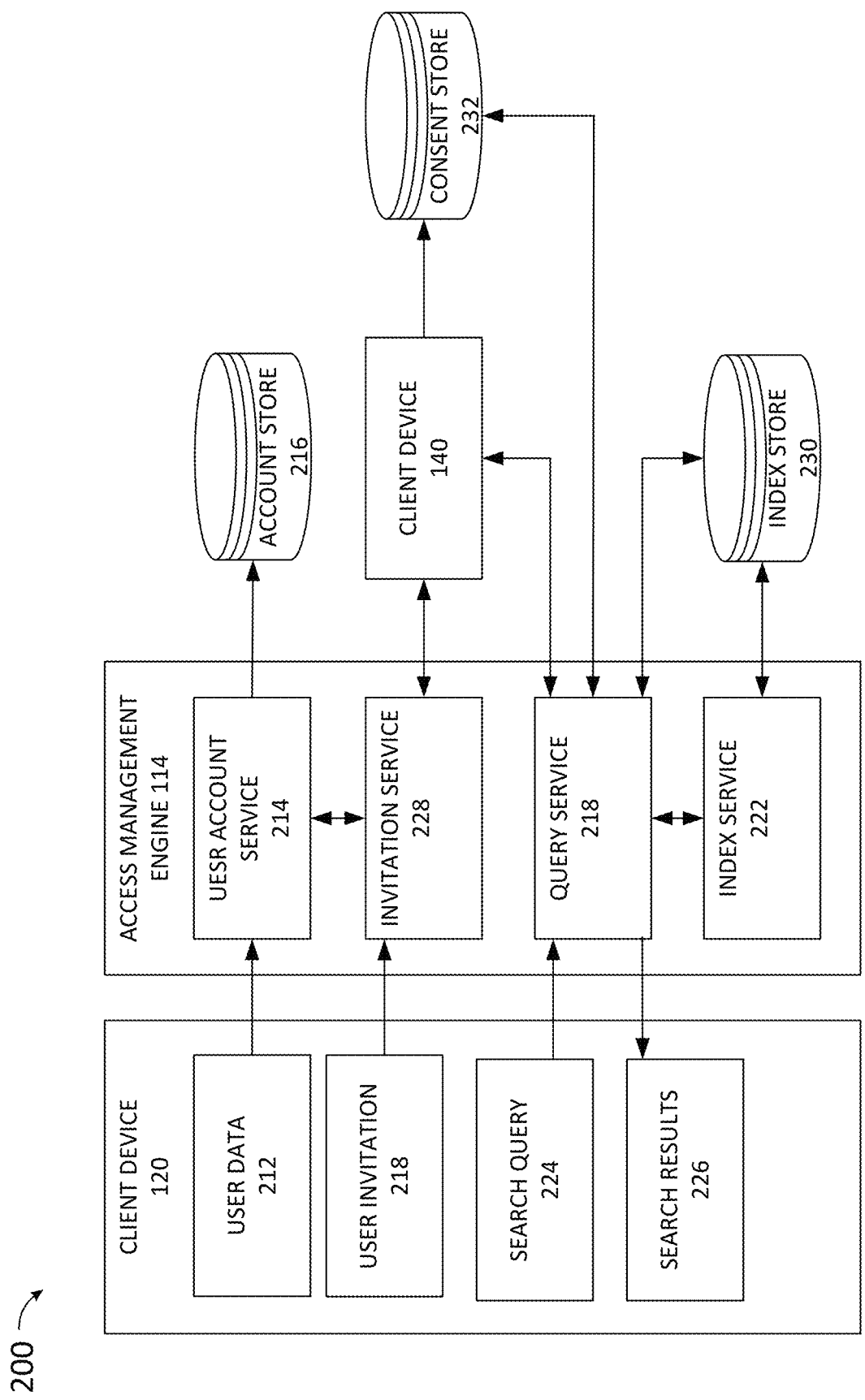
FIG. 2 depicts an example data flow between some elements of a system that provides access to documents stored in personal storage mediums.

FIG. 2 depicts an example data flow between some of the elements of a system that provides access to documents stored in personal storage mediums. To ensure compliance with privacy guidelines and enable a user to select the types of documents they are willing to share with each specific user, the system 200 may make use of a user account service 214, an invitation service 228 and a query service 218. The user account service 214, invitation service 228, query service 218 and index service 222 may be included in the access management engine 114. Alternatively, one or more of the user account service 214, invitation service 228, query service 218 and index service 222 may be separate elements, while being accessible to the access management engine 114.

The user account service 214 may be an account service that stores user account information for various services such as document access management services (e.g., services offered by the access management engine 114). The user account service 214 may provide an online service (e.g., via a website) that enables a user to sign up for a service by entering user profile information such as a username, identifying information (e.g., name, last name, email address and/or other verifiable information), contact information, password and the like. One of the services offered may be a document access management service for enabling access to documents stored in personal storage mediums of other users. The user information provided may be transmitted to and stored in an account store 216. To make use of access management services, a user of the client device 120 may first sign up for the access management service via the user account service (if a sign up is required). Once the user is signed up, the user may provide user data 212 to the user account service 214 to sign into the service. The user data may include login information such a username, password, access code and the like.

In some implementations, the user account service operates with the invitation service 228 to enable the user to send an invitation to one or more other users for sharing their documents with the first user. This may involve, the first user signing into the user account service and sending a user invitation 218 for other users to grant permission for access to their documents via the invitation service 228. Alternatively, the user may transmit the user invitation 218 to the user account service 214 (e.g., via an option provided on a UI screen) which may then transmit the user invitation 218 to the invitation service 228.

The invitation service 228 may provide an online service (e.g., a web invitation service) offering one or more UI elements that enable a user to enter information and submit a request for inviting others to share their documents. The information entered into the invitation service 228 may include user invitation 218 which may include identifying information about the requesting user, identifying information about the users that are being invited to share their documents and/or contact information (e.g., email address, usernames, etc.) for the invitees. In an example, the first user may enter their information (e.g., name, email address, username, etc.,), if that information has not been already entered. The requesting user may also provide the name, username and/or contact information of the users being invited to share their data. The invitation service 228 may then transmit the data to the user account service 214 to confirm the user's identity and/or ensure the user has an account. The user account service 214 may retrieve data from the account store 216 to confirm the user's identity.

Once the requesting user's identity is confirmed, the invitation service 228 may send an invitation to the invitee users. The invitation may be sent to an email address or other contact information of the invitee users. An invitee user may access the invitation via their personal client device such as client device 140. The invitation may include a link to a website (e.g., the invitation service 228) at which the invitee user can sign up for the service and/or provide consent for access to their documents. To sign up for the service, the invitee user may need to sign up for a user account with the service and/or provide information such as a name, username, password, contact information and the like.

Once the user has signed up for the service, if signup is required, or if the user has already signed up and is signed in, the user may be prompted to provide consent for access to the user's documents. This may involve the user selecting the types of documents to which access should be granted. Access may be granted at different granular levels. For example, a user may be willing to grant access to all of their locally stored documents. Another user may wish to select the exact documents to which access is granted. This may be done by enabling the user to browse documents on their local storage medium such as the client device 140, or on any other client device owned by the user (e.g., the user's mobile device, or the user's personal cloud storage medium). In an example, the invitee user can log into the invitation service from each of the user's personal device on which documents are stored and to which access should be granted to browse the local documents and select the ones to which access should be granted. The user may be able to browse and select the folders or documents to which they grant access. Furthermore, the user may be able to provide information about the types of documents to which access should be granted. For example, the user may be able to select a document type (e.g., all spreadsheet documents), a keyword in the title of the documents (e.g., all documents that contain the term "invoice" in their name), or a document containing certain templates (e.g., all documents containing an invoice template).

The user may also be able to specify more parameters. For example, the user may indicate that emails containing an attachment that includes the keyword "invoice" in the name should be accessible. In another example, the user may exclude all documents containing names of family members. Furthermore, a time period during which access should be granted may be provided (e.g., access can be provided for the next 30 days). Moreover, the consent provided may be revocable at any time. This may be achieved by providing an option for revoking the consent via the invitation service and/or the user account service at any time the invitee user decides to revoke their consent. Still further, the type of access may be specified. For example, the user may only allow that the document indices be searched, and the name of documents be provided in a search result list to the requester, instead of enabling retrieval of the documents. In another example, the user may simply consent to providing notification to the requesting user that the document owner has some documents that correspond with the search results without providing either the name or the full document to the requester. To simplify the process of selecting consent granularities, the invitation service may provide several broad categories of restriction for the user to choose from (e.g., broad access, restricted access, highly restricted access). Each of the categories may have specific access permissions associated with the category. For example, the highly restricted category may allow searching against the search indices of the personal storage medium and may only provide an indication to the requester of whether or not the user has documents that are responsive to the search query. It should be noted that the permission system does not require reciprocity. For example, a first user may grant full access to a second user, while the second user grants no access to the first user.

Other selectable parameters of the consent options may include whether permission is granted to make the documents available when the user is offline. If such a permission is granted, the access management engine 114 may enable access to and storage of the accessible documents and/or their search indexes in a cloud storage medium such as the index store 230. This may be achieved by utilizing the index service 222 which may index and/or enable storage of already available indices in the index store 230. In this manner, even if the client device 140 is offline when a search query is received, access to the documents may still be available. Otherwise, when the requesting user attempts to access the documents while client device 140 is offline, a notification may be provided to the requesting user that the documents are currently unavailable. In an example, access may only be granted for searching purposes (e.g., only the search index may be retrieved and stored in a cloud storage medium). In this manner, the requesting user may be able to conduct a search and receive a list of matching documents with an indication that the documents are currently unavailable for retrieval.

In some implementations, an option is provided to enable the access management engine 114 to determine which documents to provide access to. For example, a selectable option may be offered to provide access to all business-related documents. The selectable option may clarify that in such a case, the system will determine which documents are business related. This may involve the use of one or more machine-learning models (not shown) which may be trained to classify documents based on one or more parameters. The parameters may include type of document, document title, document association with other applications (e.g., document was originally received in an email titled "February invoices"), documents' associations with other users (e.g., the author of the document is a coworker) and the like.

Once consent has been granted and the selected parameters are chosen, information about the type of consent granted, the documents selected, and any other selected parameters may be transmitted from the client device 140 to the consent store 232 for storage. The information may be stored in a consent data store along with identifying information about the granting user and/or the requesting user. In an example, the consent information is provided from the client device 140 to the invitation store 228, which will in turn provide the information to the consent store 232 for storage. In an alternative information, the consent information is provided to the account store 216 for storage.

After consent has been provided and stored, the requesting user may submit a search query 224 via the client device 120 or via another client device of the user by signing into an access management application (e.g., application 124 or 116), an access management website, the user account service 214 or the query service 218. For example, the query service 218 may provide a web-based UI screen (e.g., website) at which the user can login and submit a search query 224. The login information may be transmitted to the user account service 214 to confirm the user's identity. The search query 224 may include one or more search terms (e.g., keywords) for which the user desires to conduct a search. The search query 224 may also include the identity (e.g., name or contact information) of the users whose personal storage mediums should be searched for the documents. In one example, the user may select a category of users whose personal storage mediums should be searched. For example, the user may select all employees of the user's business. This may be offered when the user submits identifying information during the invitation process to create a group of users associated with a business or a family that share documents with each other. In some implementations, the search query 224 does not include information about the users whose documents should be searched. Instead, once the search query 224 is received by the query service 218, the query service 218 transmits a request to the consent store 232 to determine which users have granted consent to the requesting user to access their documents. A search is then conducted against the search indices of the users who have granted consent. The search query 224 may also include other parameters such as the type of document searched for (e.g., spreadsheet, email, word document, and the like), editing information (e.g., documents edited by certain users), timing information (e.g., documents created in the last month) and the like. Such information may be used to search for metadata associated with documents.

Once the search query 224 is received by the query service 218, the query service may first verify that consent to access the documents has been granted by the document owner. This may involve sending a request for verifying information to the consent store 232, receiving the information from the consent store and verifying consent. Alternatively, the query service 218 may send a request for verification to a verification service (not shown) which may conduct the verification process. Verification may involve comparing the user identification information provided in the search query 224 for users whose documents should be searched (or determined based on information received from the consent store) with the consent information to determine if consent to the requested document has been granted by the document owner to the requesting user.

After verification has been completed and consent has been confirmed, the query service 218 may send a search request to the client device 140 for searching the index libraries of the client device 140. The search request may specify the specific types of documents to which access may be granted in the search request. For example, the search request may specify that only the folder titled business documents should be searched. In response, the client device 140 may transmit a list of search results to the query service 218. When multiple user client devices are searched, the query service 218 may receive multiple search results from the different client devices. The query service 218 may then combine and/or rank the search results based on an order of relevance before transmitting a search results 226 to the client device 120. The client device 120 may combine the search results with any locally identified search results to provide a complete search result list to the user. The search results may include a list of the identified documents. The list may include information such as the title of the document, date created or last accessed, author, and the like. The requesting user may then be able to select one or more of the search results for retrieval. Upon receiving the retrieval request, the query service 218 may retrieve the selected documents from the client device 140, before transmitting it to the client device 120. In an alternative implementation, documents associated with the search results are sent to the query service 218 and/or client device 120 when the search result list is provided.

In some implementations, when a document is retrieved from the client device 140, a notification is provided to the document owner that notifies them of the document access, the person who requested access, the time of access and/or other information. In another implementation to provide full access to the document, a specific consent from the user may be required. For example, the search result may provide the name of a document stored on the client device 140, but to retrieve the document, a notification may need to be sent to the document owner indicating that the requesting user has requested retrieval and requiring explicit consent from the document owner. In another example, the request is provided a notification that the document owner has multiple documents that correspond to the search query, but the search results are not provided until the document owner has been notified, can see the search query and/or the search results, and grant access. In yet another example, the search query is sent to the document owner and the document owner must provide consent before the requesting user is notified that the document owner has any corresponding search results. Additionally, in some implementations, the document owner may be sent (or may request) the documents that the requesting user has retrieved, so that duplicates may be removed and/or so that the document owner could determine what the requesting user is looking for.

Once the document is retrieved, the requesting user may open the retrieved document and make use of it as desired. In an example, the requesting user may modify the document and send the modified version back to the document owner. This may occur via user action or automatically and may require permission from the user who modified the document. For example, when the requesting user modifies a retrieved document and if they have granted permission for notifying the document owner, a notification may be sent to the document owner that the document was modified by the requester. The notification may enable the document owner to submit a request for receiving the modified version of the document.

When one or more search indices are stored in the index store 230, upon receiving the search query 224, the query service 218 may submit a search request to the index store 230 either directly or via the index service 222. This may occur only when the client device 140 is offline. For example, when the query service 218 does not receive a response back from the client device 140, it may determine that the client device 140 is offline and submit a search request to the index store 230 for searching for documents whose indices have been provided to the index store. When the indices have not been provided to the index store 230 and the client device 140, the query service 218 may provide a notification to the requesting user that no documents have been identified or that the requested personal storage medium is unavailable for searching. In some implementations, the query service 218 may queue the search query 224 for the offline documents (or for a query that could not be completed in the cloud) and upon the document owner's client devices returning online, the query could complete.

In some implementations, instead of or in addition to searching for documents, more specific search queries may be submitted. In an example, the search query 224 may relate to tasks and/or users associated with documents. For example, for a small business, a search query 224 may be submitted for a list of all customers who have contacted the business recently. Responding to such a search query 224 may require preprocessing of the search query 224. This may be done by one or more ML models (e.g., natural language processing (NLP) models), classifiers and/or rule-based logic mechanisms that analyze the search query 224 and retrieve one or more keyword terms and/or other parameters for conducting the search. When the search query 224 is for the list of all customers who have contacted the business recently, the query may be transformed to search for communications received within the date range of the last 30 days. The search query 224 may be transmitted to user devices of employees who have provided consent for access to their communications (e.g., emails), to the users' cloud accounts (when consent is provided) and/or to business cloud accounts (e.g., Facebook messenger account for the business). When processing the search query 224, local processing rules may classify certain contacts as personal rather than organizational (e.g., if emails from a certain contact is often stored in a personal email folder, emails from that contact may be considered personal). Communications from such contacts may then be excluded from allowable queries. Once results are received, the query service 218 may sort the search results based on receipt date. The query service 218 may also include a confidence level for the search results. When such specific queries are enabled, the consent parameters may be modified to enable the user to choose what level of access to provided. For example, the user can select to only allow other users to see if the user has contacted customers, rather than enabling access to the actual customer list or content of emails.

In this manner, the access management engine 114 may enable efficient, secure and private access to document stored in personal storage mediums. This is made possible by being able to seek and receive consent from document owners for receiving access to their documents, while enabling the document owners to choose the exact document or type of document to which they provide access to safeguard privacy and user confidentiality. In this manner, the technical solution increases efficiency, decreases costs associated with document management and storage services and increases user satisfaction.

Figure 3:
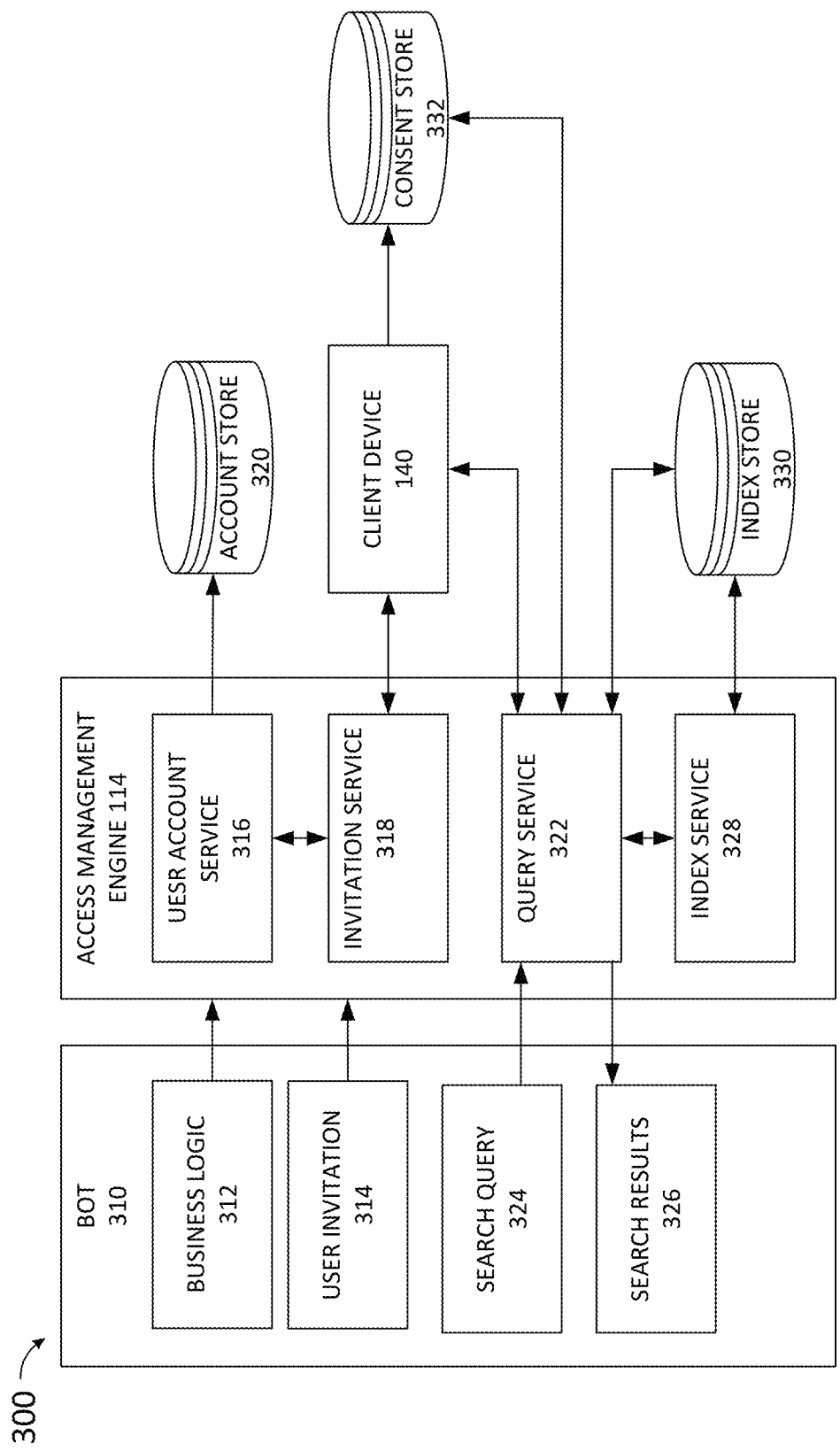
FIG. 3 depicts an alternative implementation of a system that provides access to documents stored in personal storage mediums.

FIG. 3 depicts an alternative implementation of a system that provides access to documents stored in personal storage mediums. In the system 300 of FIG. 2, instead of receiving queries from a user, a bot 310 or application logic may be used to search for and receive access to documents stored in personal storage mediums. Thus, in the system 300 a bot may execute certain operations without human involvement. Similar to system 200, operations of the system 300 requires receiving consent from users before access to their documents can be granted. This may be achieved via a user account service 316, account store 320, invitation service 318 and consent store 332. The user account service 316, account store 320, invitation service 318 and consent store 332 may operate similarly to the user account service 214, account store 216, invitation service 228 and consent store 232 of FIG. 2. However, in the system 300, the user invitation 314 to one or more users to share their documents may be received from the bot 310. The user invitation 314 may include information that informs the users that they are providing a bot access to their documents. Transmitting the request for access may be initiated via a business logic 312 of the bot 310 which may automatically determine that access to certain user's documents is needed. In some implementations, some users may be automatically registered, or they may provide consent for access to certain documents when they agree to certain terms while setting up their devices and/or some applications. For example, as part of the terms of service and/or privacy notices, notification may be provided for registration for bot access to the user's data and that upon agreement they provide their consent for such access.

Once registration and/or consent is provided either explicitly or automatically, bot 310 may transmit a search query 324 for access to documents stored locally, for example, in the client device 140. In response, the client device 140 may transmit a list of search results to the query service 322. The query service may operate in a similar manner as the query service 218. Thus, the query service 322 may receive, the search results, combine them, when multiple results are received, and/or rank the search results based on an order of relevance before transmitting a search results 326 to the bot 310. The bot 310 may then use the search results 326 to retrieve documents and/or other metadata associated with the documents to execute one or more tasks. For example, bot 310 may be configured to analyze available material levels of a company and the number of materials needed for the next day every night to determine if an order for more materials should be submitted. To achieve this, at 9 pm every night, bot 310 may submit a search query 324 to the access management engine 114 to query employees' phones to look for communications during the hours of 5 pm-9 pm containing the word "order" and the company name. The query service 322 may submit a search request for the keywords "order and the company name and search documents in the employee devices (e.g., client device 140) to which access has been granted. In an example, client communications over one or more communications applications (e.g., text message applications, email, WhatsApp, and the like) are searched to retrieve out of hours confirmation that clients want to proceed with certain orders. The search results 326 may be provided to the bot 310 which may utilize the business logic 312 and/or other ML models to analyze the responses and determine what materials are needed to complete the orders. The bot 310 may then be able to automatically pre-order any required additional materials to be delivered overnight, so that production can commerce the following morning, rather than having to waste an additional day waiting for a delivery of materials. Depending on the confidence level of keyword spotting that the client wishes to proceed with the exact quotation on file, actual production could also be initiated on automated overnight production lines. As a result, by enabling access to documents stored in personal storage mediums when the users are unable to provide the required documents, businesses can proceed with their operations without needing to wait for an individual employee, thus significantly increasing efficiency.

Figure 4:
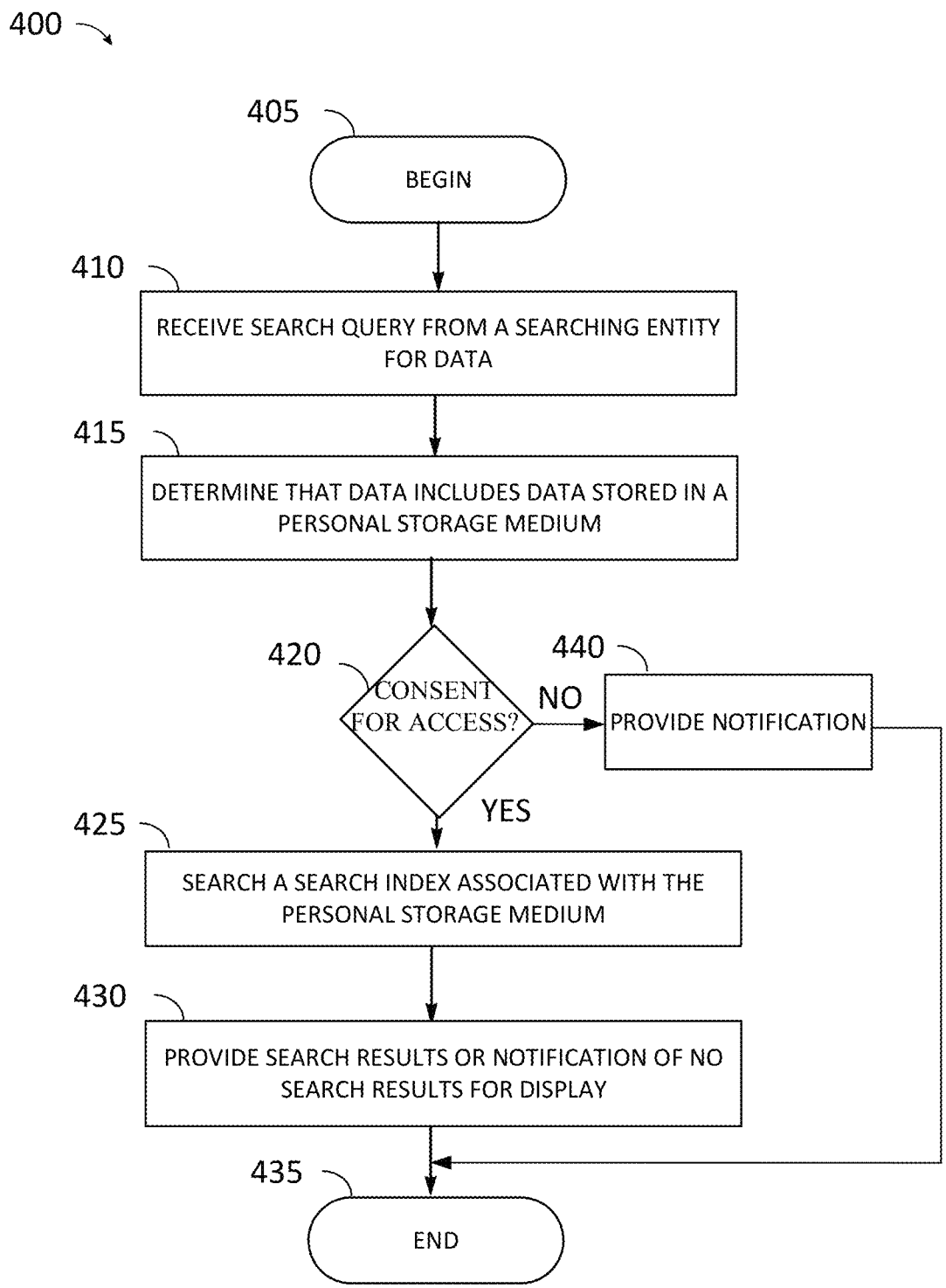
FIG. 4 is a flow diagram depicting an example method for intelligently managing and/or optimizing the use of one or more physical spaces.

FIG. 4 is a flow diagram depicting an example method 400 for providing access to documents in personal storage mediums. One or more steps of the method 400 may be performed by an access management engine such as the access management engine 114 of FIGS. 1-3 or by an application such as applications 116, 124 or 144 of FIG. 1. The method 400 may begin, at 405, and proceed to receive a search query from a searching entity, at 410. In an example, the search query may be received via an application that enables searching within and outside of a user's personal storage mediums. The search query may be received when a user submits a query (e.g., one or more search terms) via a UI screen. The search query may also include information about the specific storage mediums that should be searched, the type of document searched for, time restrictions associated with the document (e.g., only documents created or received in the last 30 days). In another example, the search query may be a question (e.g., a question submitted by a bot) and the answer to the question may require access to data and/or documents stored in personal storage medium of users outside/remote to the searching entity. The searching entity may be another user or a bot. The personal storage medium searched may be a storage medium which is normally outside the reach of the searching entity (e.g., the searching entity is normally not allowed to access the personal storage medium).

After receiving the search query, method 400 may proceed to determine that the data searched for includes data stored in a personal storage medium that is outside of the searching entity, at 415. This may occur, for example, when the search query includes a parameter indicating that specific personal storage mediums should be searched. Alternatively, determining that the data searched for includes data stored in a personal storage medium may occur when the system determines that the searching entity has sent an invitation and received responses for receiving access to one or more personal storage mediums. For example, after a searching entity (e.g., a user) sends an invitation to one or more other users for allowing access to their data and the other users create accounts and/or provide consent, searching applications associated with the searching entity (e.g., an application that has a search function) may automatically add the folders and/or documents in the personal storage mediums to which access is granted in the list of folders/documents that can be searched.

Once it is determined that the data searched for includes data that may be stored in a personal storage medium, method 400 may proceed to determine, at 420, if consent has been to the searching entity to access the data in the personal storage medium. This may be determined by utilizing a verification service and/or checking a consent data store that stores consent data to determine if the owner of the personal storage medium has granted access to the searching entity. When it is determined that consent has been granted (yes at 420), method 400 may proceed to conduct a search of a search index associated with the personal storage medium, at 425. This may involve comparing one or more search terms in the search query to data of the search index to determine if any matching data and/or document can be identified. This may process may involve using a search engine that is configured to conduct a search for documents and/or data. The search index may be stored locally at the personal storage medium or may be stored in a cloud-based storage medium to enable searching even when the personal storage medium is offline.

After the search index has been searched, method 400 may proceed to provide the search results, when search results are available or provide a notification that no search results was identified, at 430, before ending at 435. The notification may be transmitted to the searching entity and may include data that can be displayed to a user to notify the user that no results were found. Furthermore, when method 400 determines that consent for access to the personal storage medium has not been provided (no at 420), method 400 may proceed to provide a notification to the searching entity, at 440, before ending at 435. The notification may be displayed to the user to inform the user that consent for access to the document has not been granted.

Figure 5:
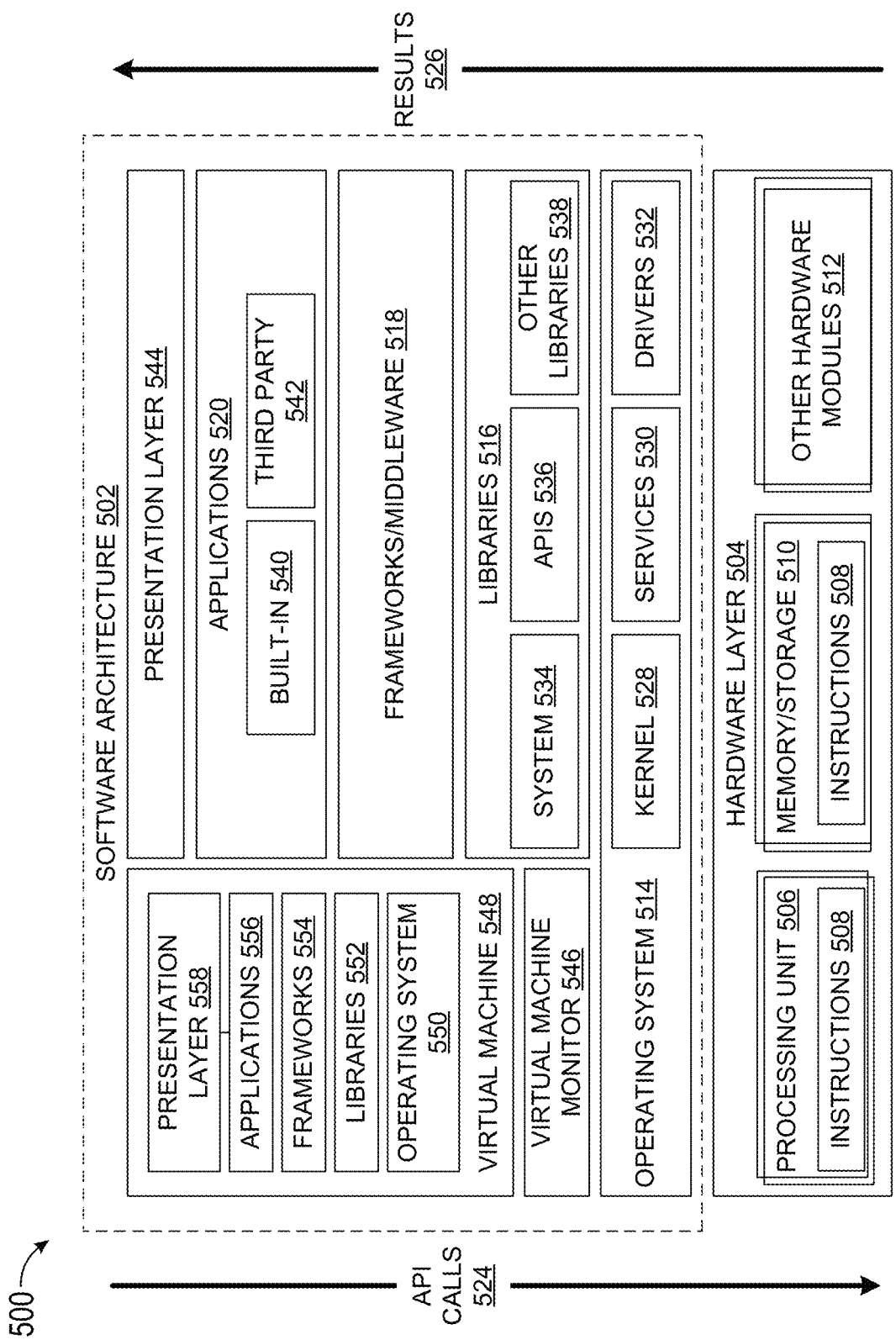
FIG. 5 is a block diagram illustrating an example software architecture, various portions of which may be used in conjunction with various hardware architectures herein described.

FIG. 5 is a block diagram 500 illustrating an example software architecture 502, various portions of which may be used in conjunction with various hardware architectures herein described, which may implement any of the above-described features. FIG. 5 is a non-limiting example of a software architecture and it will be appreciated that many other architectures may be implemented to facilitate the functionality described herein. The software architecture 502 may execute on hardware such as client devices, native application provider, web servers, server clusters, external services, and other servers. A representative hardware layer 504 includes a processing unit 506 and associated executable instructions 508. The executable instructions 508 represent executable instructions of the software architecture 502, including implementation of the methods, modules and so forth described herein.

The hardware layer 504 also includes a memory/storage 510, which also includes the executable instructions 508 and accompanying data. The hardware layer 504 may also include other hardware modules 512. Instructions 508 held by processing unit 506 may be portions of instructions 508 held by the memory/storage 510.

The example software architecture 502 may be conceptualized as layers, each providing various functionality. For example, the software architecture 502 may include layers and components such as an operating system (OS) 514, libraries 516, frameworks 518, applications 520, and a presentation layer 544. Operationally, the applications 520 and/or other components within the layers may invoke API calls 524 to other layers and receive corresponding results 526. The layers illustrated are representative in nature and other software architectures may include additional or different layers. For example, some mobile or special purpose operating systems may not provide the frameworks/middleware 518.

The OS 514 may manage hardware resources and provide common services. The OS 514 may include, for example, a kernel 528, services 530, and drivers 532. The kernel 528 may act as an abstraction layer between the hardware layer 504 and other software layers. For example, the kernel 528 may be responsible for memory management, processor management (for example, scheduling), component management, networking, security settings, and so on. The services 530 may provide other common services for the other software layers. The drivers 532 may be responsible for controlling or interfacing with the underlying hardware layer 504. For instance, the drivers 532 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 516 may provide a common infrastructure that may be used by the applications 520 and/or other components and/or layers. The libraries 516 typically provide functionality for use by other software modules to perform tasks, rather than rather than interacting directly with the OS 514. The libraries 516 may include system libraries 534 (for example, C standard library) that may provide functions such as memory allocation, string manipulation, file operations. In addition, the libraries 516 may include API libraries 536 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 516 may also include a wide variety of other libraries 538 to provide many functions for applications 520 and other software modules.

The frameworks 518 (also sometimes referred to as middleware) provide a higher-level common infrastructure that may be used by the applications 520 and/or other software modules. For example, the frameworks 518 may provide various graphic user interface (GUI) functions, high-level resource management, or high-level location services. The frameworks 518 may provide a broad spectrum of other APIs for applications 520 and/or other software modules.

The applications 520 include built-in applications 540 and/or third-party applications 542. Examples of built-in applications 540 may include, but are not limited to, a contacts application, a browser application, a location application, a media application, a messaging application, and/or a game application. Third-party applications 542 may include any applications developed by an entity other than the vendor of the particular system. The applications 520 may use functions available via OS 514, libraries 516, frameworks 518, and presentation layer 544 to create user interfaces to interact with users.

Some software architectures use virtual machines, as illustrated by a virtual machine 548. The virtual machine 548 provides an execution environment where applications/modules can execute as if they were executing on a hardware machine (such as the machine depicted in block diagram 600 of FIG. 6, for example). The virtual machine 548 may be hosted by a host OS (for example, OS 514) or hypervisor, and may have a virtual machine monitor 546 which manages operation of the virtual machine 548 and interoperation with the host operating system. A software architecture, which may be different from software architecture 502 outside of the virtual machine, executes within the virtual machine 548 such as an OS 550, libraries 552, frameworks 554, applications 556, and/or a presentation layer 558.

Figure 6:
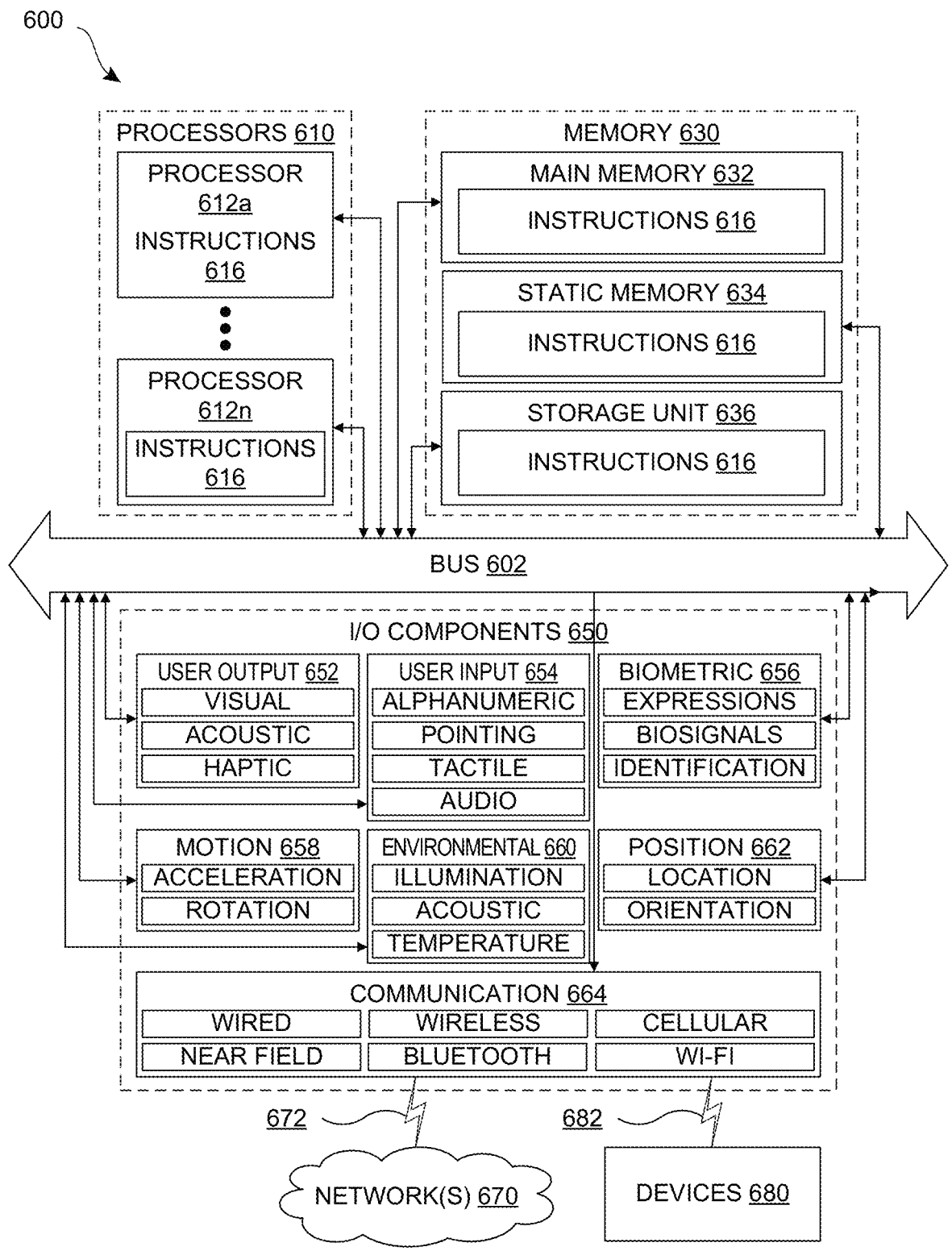
FIG. 6 is a block diagram illustrating components of an example machine configured to read instructions from a machine-readable medium and perform any of the features described herein.

FIG. 6 is a block diagram illustrating components of an example machine 600 configured to read instructions from a machine-readable medium (for example, a machine-readable storage medium) and perform any of the features described herein. The example machine 600 is in a form of a computer system, within which instructions 616 (for example, in the form of software components) for causing the machine 600 to perform any of the features described herein may be executed. As such, the instructions 616 may be used to implement methods or components described herein. The instructions 616 cause unprogrammed and/or unconfigured machine 600 to operate as a particular machine configured to carry out the described features. The machine 600 may be configured to operate as a standalone device or may be coupled (for example, networked) to other machines. In a networked deployment, the machine 600 may operate in the capacity of a server machine or a client machine in a server-client network environment, or as a node in a peer-to-peer or distributed network environment. Machine 600 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 600 is illustrated, the term "machine" includes a collection of machines that individually or jointly execute the instructions 616.

The machine 600 may include processors 610, memory 630, and I/O components 650, which may be communicatively coupled via, for example, a bus 602. The bus 602 may include multiple buses coupling various elements of machine 600 via various bus technologies and protocols. In an example, the processors 610 (including, for example, a central processing unit (CPU), a graphics processing unit (GPU), a digital signal processor (DSP), an ASIC, or a suitable combination thereof) may include one or more processors 612*a* to 612*n* that may execute the instructions 616 and process data. In some examples, one or more processors 610 may execute instructions provided or identified by one or more other processors 610. The term "processor" includes a multi-core processor including cores that may execute instructions contemporaneously. Although FIG. 6 shows multiple processors, the machine 600 may include a single processor with a single core, a single processor with multiple cores (for example, a multi-core processor), multiple processors each with a single core, multiple processors each with multiple cores, or any combination thereof. In some examples, the machine 600 may include multiple processors distributed among multiple machines.

The memory/storage 630 may include a main memory 632, a static memory 634, or other memory, and a storage unit 636, both accessible to the processors 610 such as via the bus 602. The storage unit 636 and memory 632, 634 store instructions 616 embodying any one or more of the functions described herein. The memory/storage 630 may also store temporary, intermediate, and/or long-term data for processors 610. The instructions 616 may also reside, completely or partially, within the memory 632, 634, within the storage unit 636, within at least one of the processors 610 (for example, within a command buffer or cache memory), within memory at least one of I/O components 650, or any suitable combination thereof, during execution thereof. Accordingly, the memory 632, 634, the storage unit 636, memory in processors 610, and memory in I/O components 650 are examples of machine-readable media.

As used herein, "machine-readable medium" refers to a device able to temporarily or permanently store instructions and data that cause machine 600 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 616) for execution by a machine 600 such that the instructions, when executed by one or more processors 610 of the machine 600, cause the machine 600 to perform and one or more of the features described herein. Accordingly, a "machine-readable medium" may refer to a single storage device, as well as "cloud-based" storage systems or storage networks that include multiple storage apparatus or devices.

The I/O components 650 may include a wide variety of hardware components adapted to receive input, provide output, produce output, transmit information, exchange information, capture measurements, and so on. The specific I/O components 650 included in a particular machine will depend on the type and/or function of the machine. For example, mobile devices such as mobile phones may include a touch input device, whereas a headless server or IoT device may not include such a touch input device. The particular examples of I/O components illustrated in FIG. 6 are in no way limiting, and other types of components may be included in machine 600. The grouping of I/O components 650 are merely for simplifying this discussion, and the grouping is in no way limiting. In various examples, the I/O components 650 may include user output components 652 and user input components 654. User output components 652 may include, for example, display components for displaying information (for example, a liquid crystal display (LCD) or a projector), acoustic components (for example, speakers), haptic components (for example, a vibratory motor or force-feedback device), and/or other signal generators. User input components 654 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 650 may include biometric components 656, motion components 658, environmental components 660 and/or position components 662, among a wide array of other environmental sensor components. The biometric components 656 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 662 may include, for example, location sensors (for example, a Global Position System (GPS) receiver), altitude sensors (for example, an air pressure sensor from which altitude may be derived), and/or orientation sensors (for example, magnetometers). The motion components 658 may include, for example, motion sensors such as acceleration and rotation sensors. The environmental components 660 may include, for example, illumination sensors, acoustic sensors and/or temperature sensors.

The I/O components 650 may include communication components 664, implementing a wide variety of technologies operable to couple the machine 600 to network(s) 670 and/or device(s) 680 via respective communicative couplings 672 and 682. The communication components 664 may include one or more network interface components or other suitable devices to interface with the network(s) 670. The communication components 664 may include, for example, components adapted to provide wired communication, wireless communication, cellular communication, Near Field Communication (NFC), Bluetooth communication, Wi-Fi, and/or communication via other modalities. The device(s) 680 may include other machines or various peripheral devices (for example, coupled via USB).

In some examples, the communication components 664 may detect identifiers or include components adapted to detect identifiers. For example, the communication components 664 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 662, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-6) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

What is claimed is:

1. A data processing system comprising:
   a processor; and
   a memory in communication with the processor, the memory comprising executable instructions that, when executed by the processor alone or in combination with other processors, cause the data processing system to perform functions of:
      receiving from a first client device associated with a first user and over a communication network, consent for access to one or more of the first user's documents, the one or more of the first user's documents being stored in a personal storage medium of the first user, the consent including a setting to select whether permission is granted to make the one or more of the first user's documents available when the first user is offline;
      storing information associated with the consent in a consent store;
      creating search indices for the one or more of the first user's documents via an index service;
      storing the created search indices in an index store of a cloud storage medium;
      receiving from a second client device associated with a second user, a search query for searching for data, the search query being received at a query service associated with an access management system;
      determining that the data is stored in the personal storage medium of the first user;
      upon determining that the data is stored in the personal storage medium of the first user, transmitting, from the query service associated with the access management system, a request to the consent store to determine whether the first user has consented to provide access to the data to the second user and to determine whether the first user has consented to provide access to the data when the first user is offline;

receiving over the communication network a confirmation from the consent store that the first user has consented to provide access to the data to the second user and the first user has provided consent to access the data when the first user is offline;

determining that the first user is offline;

upon determining that the first user is offline, transmitting a request from the query service associated with the access management system to the index store to identify one or more search results for the search query; and providing, via the query service associated with the access management system to the second client device, at least one of the one or more search results or a notification that no search results were identified.

2. The data processing system of claim 1, wherein the personal storage medium is a local storage medium of a client device of the first user.

3. The data processing system of claim 1, wherein the memory comprises executable instructions that, when executed by processor alone or other processors, further cause the data processing system to perform functions of:

upon receiving the consent, determining that the first has user has granted permission to make the one or more of the first user's documents available when the first user is offline, and upon determining that the first has granted permission to make the one or more of the first user's documents available when the first user is offline, storing the one or more of the first user's documents in the cloud storage medium.

4. The data processing system of claim 1, wherein information stored in the consent store include at least one of a type of document to which access is granted, a type of access, a file folder to which access is granted, and a time period during which access is granted.

5. The data processing system of claim 1, wherein the memory comprises executable instructions that, when executed by processor, further cause the data processing system to perform functions of:

receiving an invitation request from the second user, over the communication network, to invite the first user to consent to provide access to documents stored on the personal storage medium of the first user to the second user;

transmitting an invitation, via an invitation service of the access management system, to the first user to grant consent to providing access to the documents stored on the personal storage medium to the first user; and receiving a confirmation from the invitation service of the access management system that the first user has provided consent.

6. The data processing system of claim 5, wherein the invitation service enables the first user to select the documents to which access is granted.

7. A method for providing access to data stored in a personal storage medium of a first user comprising:

receiving from a first client device associated with a first user and over a communication network, consent for access to one or more of the first user's documents, the one or more of the first user's documents being stored in a personal storage medium of the first user, the consent including a setting to select whether permission is granted to access the one or more of the first user's documents when the first user is offline;

storing information associated with the consent in a consent store;

creating search indices for the one or more of the first user's documents via an index service;

determining that the first user has not granted permission to access the one or more of the first user's documents when the first user is offline;

upon determining that the first user has not granted permission to access the one or more of the first user's documents when the first user is offline, storing the created search indices in an index store of the personal storage medium of the first user;

receiving from a searching entity, a search query for searching for data, the search query being received at a query service associated with an access management system;

determining that the data is stored in the personal storage medium of the first user;

upon determining that the data is stored in the personal storage medium of the first user, transmitting, from the query service associated with the access management system, a request to the consent store to determine whether the first user has consented to provide access to the data to the searching entity and to determine whether the first user has consented to provide access to the data when the first user is offline;

receiving over the communication network a confirmation from the consent store that the first user has consented to provide access to the data to the searching entity and the first user has not provided consent to access the data when the first user is offline;

determining that the first user is offline; and upon determining that the first user is offline, providing, via the query service associated with the access management system to the searching entity a notification that the personal storage medium of the first user is not available for searching.

8. The method of claim 7, wherein the personal storage medium is a local storage medium of a client device of the user.

9. The method of claim 7, wherein information stored in the consent store include at least one of type of document to which access is granted, a type of access, a file folder to which access is granted, and a time period during which access is granted.

10. The method of claim 7, further comprising upon determining that the first user is offline, queueing the search query for when the first user returns online.

11. The method of claim 10, further comprising:

determining that the first user is online;

transmitting a request from the query service associated with the access management system to the index store to identify one or more search results for the search query; and providing, via the query service associated with the access management system to the searching entity, at least one of the one or more search results or a notification that no search results were identified.

12. The method of claim 7, further comprising:

receiving an invitation request from the searching entity, over the communication network, to invite the first user to consent to provide access to documents stored on the personal storage medium of the first user to the searching entity;

transmitting an invitation, via an invitation service of the access management system, to the first user to grant consent to providing access to the documents stored on the personal storage medium to the first user; and receiving a confirmation from the invitation service of the access management system that the first user has provided consent.

13. The method of claim 7, wherein the invitation service enables the first user to select the documents to which access is granted.

14. The method of claim 7, wherein the searching entity is at least one of a bot or an application.

15. A non-transitory computer readable medium on which are stored instructions that, when executed, cause a programmable device to perform functions of:

receiving from a first client device associated with a first user and over a communication network, consent for access to one or more of the first user's documents, the one or more of the first user's documents being stored in a personal storage medium of the first user, the consent including a setting to select whether permission is granted to make the one or more of the first user's documents available when the first user is offline;

storing information associated with the consent in a consent store;

creating search indices for the one or more of the first user's documents via an index service;

storing the created search indices in an index store of a cloud storage medium;

receiving from a second client device associated with a second user, a search query for searching for data, the search query being received at a query service associated with an access management system;

determining that the data is stored in the personal storage medium of the first user;

upon determining that the data is stored in the personal storage medium of the first user, transmitting, from the query service associated with the access management system, a request to the consent store to determine whether the first user has consented to provide access to the data to the second user and to determine whether the first user has consented to provide access to the data when the first user is offline;

receiving over the communication network a confirmation from the consent store that the first user has consented to provide access to the data to the second user and the first user has provided consent to access the data when the first user is offline;

determining that the first user is offline;

upon determining that the first user is offline, transmitting a request from the query service associated with the access management system to the index store to identify one or more search results for the search query; and providing, via the query service associated with the access management system to the second client device, at least one of a list of matching documents along with an indication that the documents are currently unavailable for retrieval or a notification that no search results were identified.

16. The non-transitory computer readable medium of claim 15, wherein the personal storage medium is a local storage medium of a client device of the second user.

17. The non-transitory computer readable medium of claim 15, wherein determining whether the first user has consented to provide access to the data includes comparing a user identification information provided in the search query for a user whose data should be searched with consent information stored in the consent store to determine if the first user has consented to provide access to the first user's personal storage medium, and if the first user has provided consent to grant access to the second user.

18. The non-transitory computer readable medium of claim 15, wherein the instructions further cause a programmable device to perform functions of:

receiving an invitation request from the second user, over the communication network, to invite the first user to consent to provide access to documents stored on the personal storage medium of the first user to the second user;

transmitting an invitation, via an invitation service of the access management system, to the first user to grant consent to providing access to the documents stored on the personal storage medium to the first user; and receiving a confirmation from the invitation service of the access management system that the first user has provided consent.

19. The non-transitory computer readable medium of claim 18, wherein the invitation service enables the second user to select the documents to which access is granted.

20. The non-transitory computer readable medium of claim 15, wherein the instructions further cause a programmable device to perform functions of:

upon determining that the first user is offline, queueing the search query for when the first user returns online;

determining that the first user is online;

providing, via the query service associated with the access management system to the second user, the one or more search results.

* * * * *